United States Patent [19]

Rajamannan

[11] 4,285,774
[45] Aug. 25, 1981

[54] MICROWAVE DISTILLATION

[75] Inventor: A. H. J. Rajamannan, Minneapolis, Minn.

[73] Assignee: Agrohol Systems, Inc., Minn.

[21] Appl. No.: 164,250

[22] Filed: Jun. 30, 1980

[51] Int. Cl.³ .................... B01D 3/16; C07C 31/08
[52] U.S. Cl. .................................. 202/154; 202/155; 202/159; 202/172; 202/173; 202/234; 203/19; 203/82; 203/DIG. 13; 203/100
[58] Field of Search .............. 202/155, 154, 159, 172, 202/173, 177, 234, 153, 158; 203/19, DIG. 13, 100, 82, 84, 22, 74, 75; 426/492–495

[56] References Cited

U.S. PATENT DOCUMENTS

| | | | |
|---|---|---|---|
| 2,578,469 | 11/1951 | Goldsbarry et al. | 202/173 |
| 2,658,029 | 11/1953 | Untermann et al. | 202/154 |
| 2,704,742 | 3/1955 | Petrich | 202/173 |
| 2,724,709 | 11/1955 | Spence | 202/154 |
| 3,151,042 | 9/1964 | Koshoot | 202/158 |
| 3,338,799 | 8/1967 | Brandt et al. | 202/154 |
| 3,372,096 | 3/1968 | Tidball | 202/173 |
| 3,495,648 | 2/1970 | Amadon | 203/100 |
| 3,496,071 | 2/1970 | Spence | 202/154 |
| 3,577,322 | 5/1971 | Nesbitt et al. | 203/100 |
| 3,589,984 | 6/1971 | Reid | 202/173 |
| 3,607,667 | 9/1971 | Knapp et al. | 203/100 |
| 3,700,565 | 10/1972 | Cornish et al. | 203/100 |
| 3,864,214 | 2/1975 | Ohakas | 202/173 |

Primary Examiner—Wilbur L. Bascomb, Jr.
Attorney, Agent, or Firm—Williamson, Bains, Moore & Hansen

[57] ABSTRACT

An apparatus for continuously producing concentrated alcohol from beer comprises a plurality of concentrator cells and a plurality of salvage cells arranged in a line in side-by-side relation. Liquid beer, supplied to the first upstream concentrator cell through a supply conduit, flows through passages between adjacent cells in response to the volume of beer reaching a predetermined level in the adjacent upstream cell. A microwave ignition bulb is positioned in each cell to heat the liquid beer and boil or vaporize the alcohol content thereof. The gaseous alcohol is serially bubbled through a fluid passage from each concentrator cell to the next adjacent upstream cell until the gaseous alcohol reaches the first concentrator cell where the gaseous alcohol is concentrated and condensed in a column to a liquid solution containing approximately 95% alcohol and approximately 5% water. Alcohol obtained from the dilute, substantially spent beer in the salvage cells is collected and returned to the supply conduit for recycling.

3 Claims, 1 Drawing Figure

MICROWAVE DISTILLATION

SUMMARY OF THE INVENTION

This invention relates to an apparatus for continuously producing alcohol from beer.

An object of this invention is to provide a novel apparatus for continuously separating alcohol from beer to obtain liquid containing approximately 95% alcohol and approximately 5% water.

Another object of this invention is to provide a novel apparatus for producing concentrated alcohol from beer including microwave emission units for heating and separating alcohol in concentration cells where the gaseous alcohol is collected, concentrated, and condensed.

A further object of this invention is to provide a novel apparatus for separating alcohol from beer whereby the beer is progressively passed through a plurality of concentrator and salvage cells wherein the alcohol is preheated and separated by microwave energy, the lower concentrations of alcohol being collected from salvage cells and returned to the concentrator cells for recycling therethrough.

These and other objects and advantages of this invention will more fully appear from the following description made in connection with the accompanying drawings, wherein like reference characters refer to the same or similar parts throughout the several views.

FIGURES OF THE DRAWINGS

FIG. 1, the only FIGURE of the drawing, is a diagrammatic, cross-sectional view illustrating the features of the novel apparatus.

DESCRIPTION OF THE PREFERRED EMBODIMENT OF THE INVENTION

Figure 1:
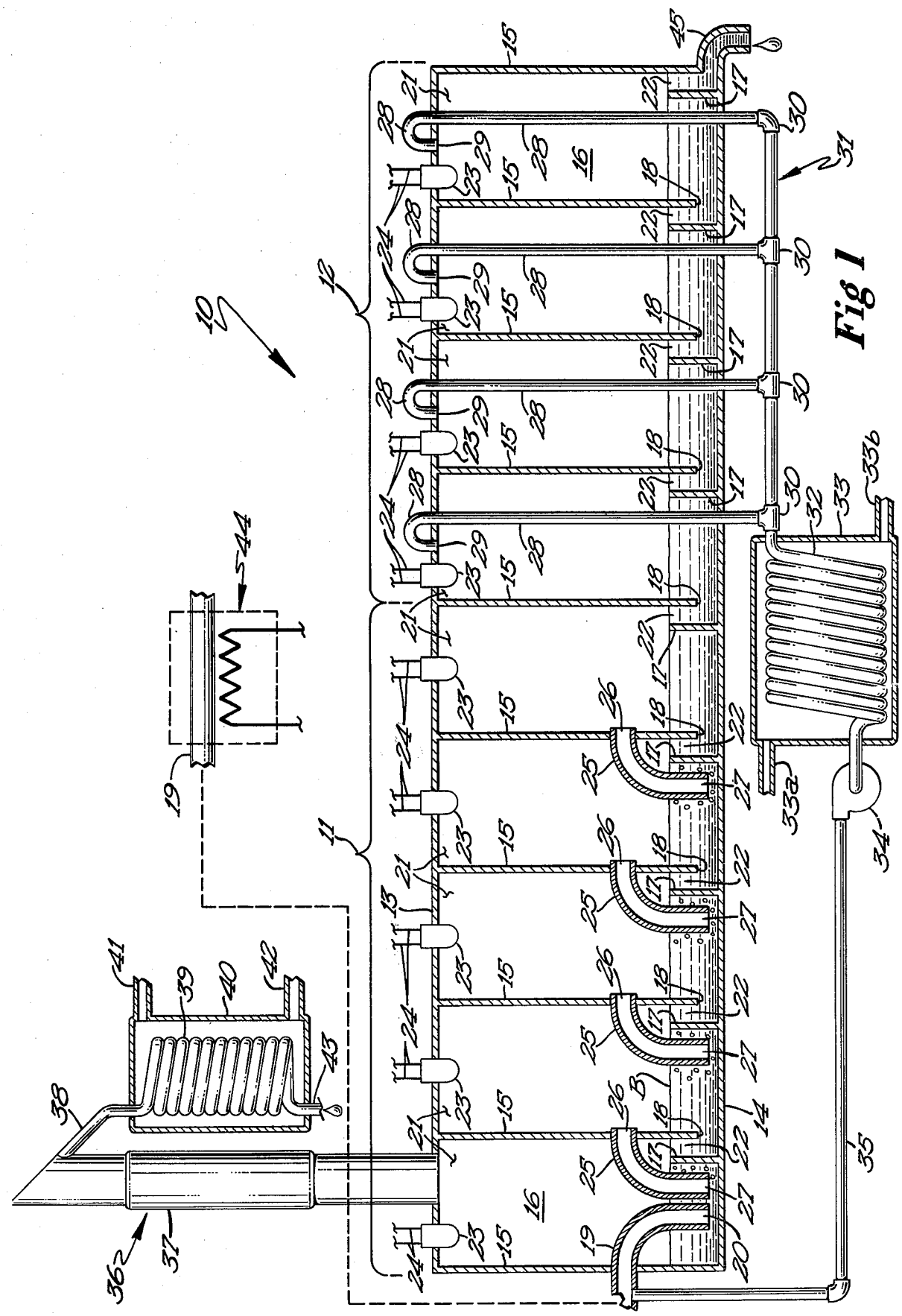

Referring now to the drawing, it will be seen that one embodiment of my novel apparatus, designated generally by the reference numeral 10, is thereshown. The apparatus 10 is specifically designed to continuously separate alcohol from beer so that relatively high concentrations of alcohol are obtained. The apparatus 10 includes a plurality of concentrator cells 11 and a plurality of salvage cells 12 arranged in a line in side-by-side relation. In the embodiment shown, the apparatus includes five concentrator cells and four salvage cells. However, theoretically, the apparatus could include one concentrator cell and one salvage cell, although it is preferred a plurality of concentrator and salvage cells be used.

Each concentrator and salvage cell is comprised of a top wall 13, a bottom wall 14, vertical end walls 15 and vertical side walls 16. In the embodiment shown, the concentrator and salvage cells are substantially identical in size and shape and each is provided with a vertically disposed baffle or wall element 17 which is affixed to the bottom wall and projects upwardly therefrom. It will also be noted that the common or intermediate vertical wall 15 between adjacent cells extends from the top wall thereof but has its lower end 18 spaced above the upper surface of the lower wall. Liquid beer is introduced into the system through an inlet or supply line 19 which discharges the liquid beer to an outlet end 20 into the interior 21 of the concentrator cell 11 located furtherest upstream. A sinuous passage 22 is defined by each baffle element 17 and each common, vertical wall 18 so that the liquid beer flows from one cell to the next adjacent cell in response to a volume of beer exceeding a predetermined level. Therefore, when the level of beer within a cell reaches a volume so that the beer overflows the baffle element, the beer progressively moves downstream. In this regard, it will be noted that a common bottom wall 14 for the entire apparatus is disposed in a single common horizontal plane.

Means are provided for instantaneously heating the liquid beer within each concentrator and salvage cell and this means includes a microwave emission bulb 23. It will be noted that each microwave emission bulb 23 is mounted in the top wall of the associated cell and each is provided with suitable conductors 24 which are connected to a source of high frequency current. The microwave emissions heat the beer to cause the alcohol to boil and vaporize into that volumetric space located above the surface of the liquid.

It will also be noted that each concentrator cell 11 is connected to the next adjacent concentrator cell by a fluid conduit 25. It will further be noted that the inlet end 26 of each conduit 25 is located above the level of the liquid beer of one concentrator cell and that the outlet end 27 of each fluid conduit is located below the level of liquid beer in the next adjacent upstream concentrator cell. With this arrangement, the gaseous alcohol produced by boiling and vaporizing of the alcohol from the liquid beer passes through each fluid conduit and bubbles through the beer of the next adjacent upstream concentrator cell. Thus, the gaseous alcohol is serially bubbled through each concentrator cell 11 until the first upstream concentrator cell is reached.

It will be appreciated that as the liquid beer passes downstream from the first concentrator cell, the concentration of alcohol in the liquid beer becomes progressively less. Thus, as the liquid beer passes from the last concentrator cell 11 into the first salvage cell 12, the concentration of alcohol in this beer is relatively low. However, the microwave emission bulbs continue to heat the liquid beer but the gaseous vapors produced by this microwave emission in the salvage cells also includes a substantial amount of water vapor along with the alcohol. The gaseous alcohol and water vapor in each salvage cell passes through the inlet end 29 of a collector pipe 28 connected to the upper wall of each salvage cell each collector pipe is connected by a coupling 30 in communicating relation to a main collector line 31. This gaseous alcohol and water vapor passes through the main collector line 31 into cooling coils 32 located in a condenser 33. The condenser 33 is provided with a coolant inlet line 33a through which coolant is introduced and a coolant outlet line 33b through which the coolant exits from the condenser. Thus, the alcohol and water vapor mixture is condensed in to a liquid in the condenser and this mixture is pumped by means of a pump 34 through a return line 35 to the inlet or supply line 19 where the mixture is mixed with the incoming beer to be treated.

The gaseous alcohol which collects in the first concentrator cell 11 in the volumetric space located above the liquid beer is directed into a concentration column 36 which is connected in communicating relation with this first concentrator cell. It will be noted that the concentration column 36 is connected to the upper wall of the first concentrator cell and includes a bubble rectifier 37 of wellknown construction for concentrating the gaseous alcohol before the alcohol is directed through the outlet conduit 38 of the concentrated column 36 and through the coils 39 of a condenser 40.

The entire concentration column is of small compass and may have a vertical dimension of one or two feet. The condenser 40 is provided with a coolant inlet line 41 through which coolant is introduced and a coolant outlet line 42 through which the coolant is circulated from the condenser and the concentrated liquid alcohol is collected through a discharge end 43. The concentration of the alcohol solution obtained from this system contains approximately 95% and 5% water. In order to increase the time efficiency of the present apparatus, the incoming beer is preferably preheated by a heater 44 which is located just upstream of the first concentrator cell 11. It is also preferred that the concentrated water-/alcohol solution collected from the salvage cells also be preheated before it is introduced into the system for recycling. The spent beer remaining in the last salvage cells 11 will contain only a trace amount of alcohol and this spent beer can be removed from the last salvage cell through an outlet 45.

It will be seen from the foregoing description that I have provided a novel apparatus which continuously separates alcohol from beer for the use of microwave energy. Arrangement of the concentrator and salvage cells in a side-by-side inline system permits the alcohol content from the beer to be progressively reduced until substantially all of the alcohol is removed from the beer in the salvage cells. By serially bubbling the gaseous alcohol upstream through each concentrator cell while progressively moving the beer continuously downstream, the alcohol is concentrated in the first concentrator where the alcohol is condensed and collected.

Thus, it will be seen that I have provided a system for not only separating alcohol from beer in a simple continuous operation, but one which functions in a more efficient manner than any heretofore known comparable system.

It is anticipated that various changes can be made in the size, shape and construction of this apparatus disclosed herein without department from the spirit and scope of my invention as defined in the following claims.

What is claimed is:

1. An apparatus for continuously producing concentrated alcohol from beer, comprising:

a plurality of similar concentrator cells and a plurality of similar salvage cells arranged in side-by-side inline relation and each cell being adapted to contain a predetermined amount of liquid beer, one of said concentrator cells being disposed adjacent one of said salvage cells, a supply conduit connected to the first upstream concentrator cell for supplying liquid beer thereto, means defining a passage between adjacent concentrator cells, between adjacent salvage cells and between said one concentrator and salvage cells to permit liquid beer to flow from each cell to the next adjacent downstream cell in response to the volume of beer reaching a predetermined level in each cell, a plurality of microwave units each being positioned in one of said concentrator and salvage cells, each unit producing microwave emissions to heat the beer and cause the alcohol to boil and vaporize, means defining a fluid conduit between each adjacent concentrator cell, said fluid conduit having one end thereof located above the level of beer in one concentrator cell and having the other end thereof located below the level of beer in the adjacent upstream concentrator cell whereby gaseous alcohol be bubbled continuously in an upstream direction through the fluid conduits and through the liquid beer for collection into the first concentrator cell, a plurality of collector pipes each communicating with one of said salvage cells and with each other for collecting gaseous alcohol and water vapor from said salvage cells, a conduit for returning said gaseous alcohol and water vapor for recycling through the concentrator cells, a concentrator column communicating with the upper end of said first upstream concentrator cells to concentrate the gaseous alcohol emanating from said first concentrator cell, and a condenser for condensing the gaseous alcohol to a liquid solution containing approximately 95% alcohol and approximately 5% water.

2. The apparatus as defined in claim 1 and means for preheating the beer before it is introduced into the first concentrator cell.

3. The apparatus as defined in claim 1 wherein each cell includes a horizontal lower wall, a vertical wall between adjacent cells, said passage means between adjacent cells including a vertical baffle element extending upwardly from the lower wall and being disposed adjacent but spaced from the vertical wall between the adjacent associated cells, the vertical wall between adjacent associated cells having its lower end spaced above the lower wall whereby liquid beer will flow in a downstream direction over the associated baffle element and below the associated vertical wall between adjacent cells.

* * * * *